April 5, 1932.　　　　F. O'NEILL　　　　1,852,329
GLASS GATHERING
Filed March 19, 1927　　6 Sheets-Sheet 1
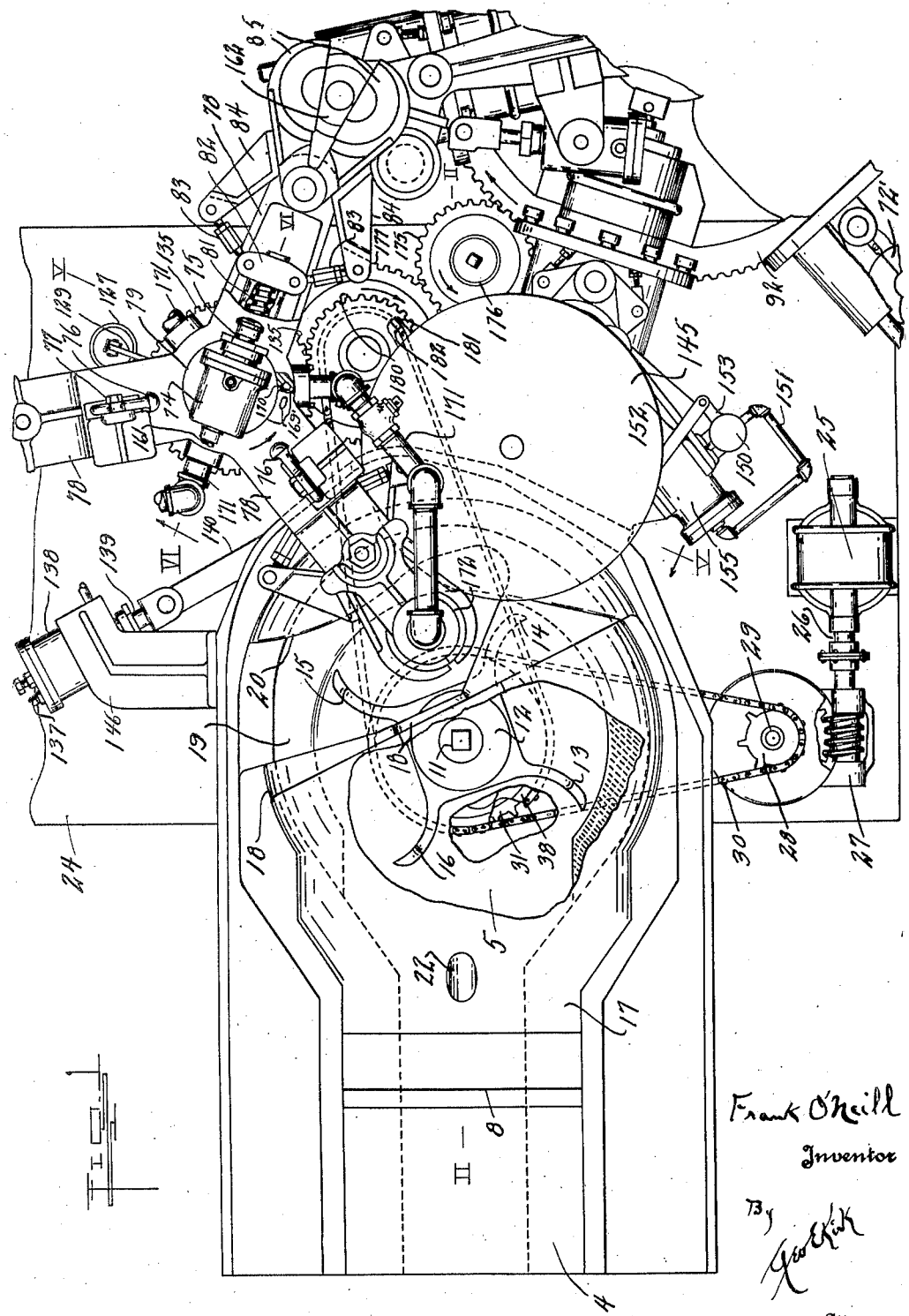
Frank O'Neill
Inventor
By
Attorney

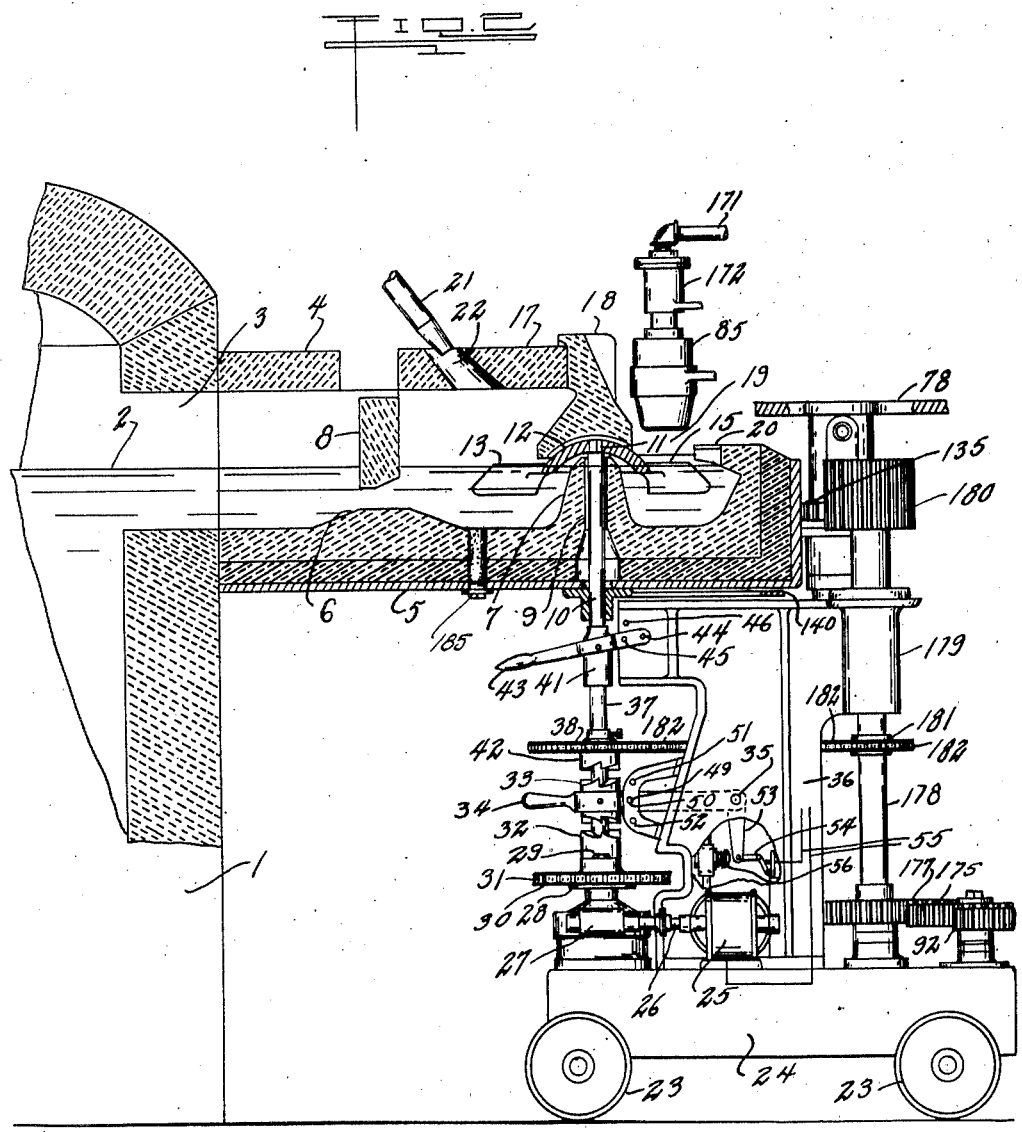

April 5, 1932.  F. O'NEILL  1,852,329
GLASS GATHERING
Filed March 19, 1927  6 Sheets-Sheet 3
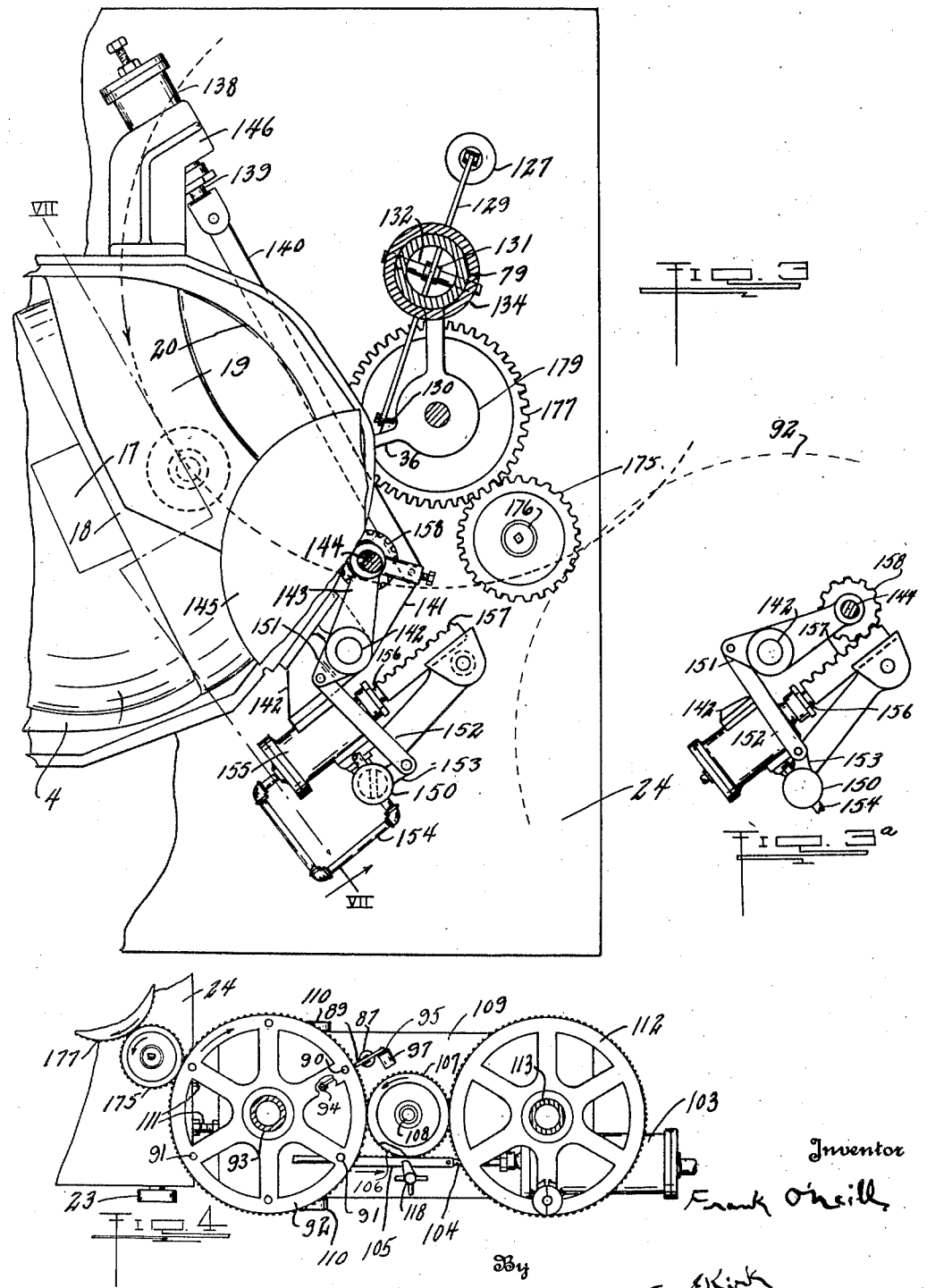

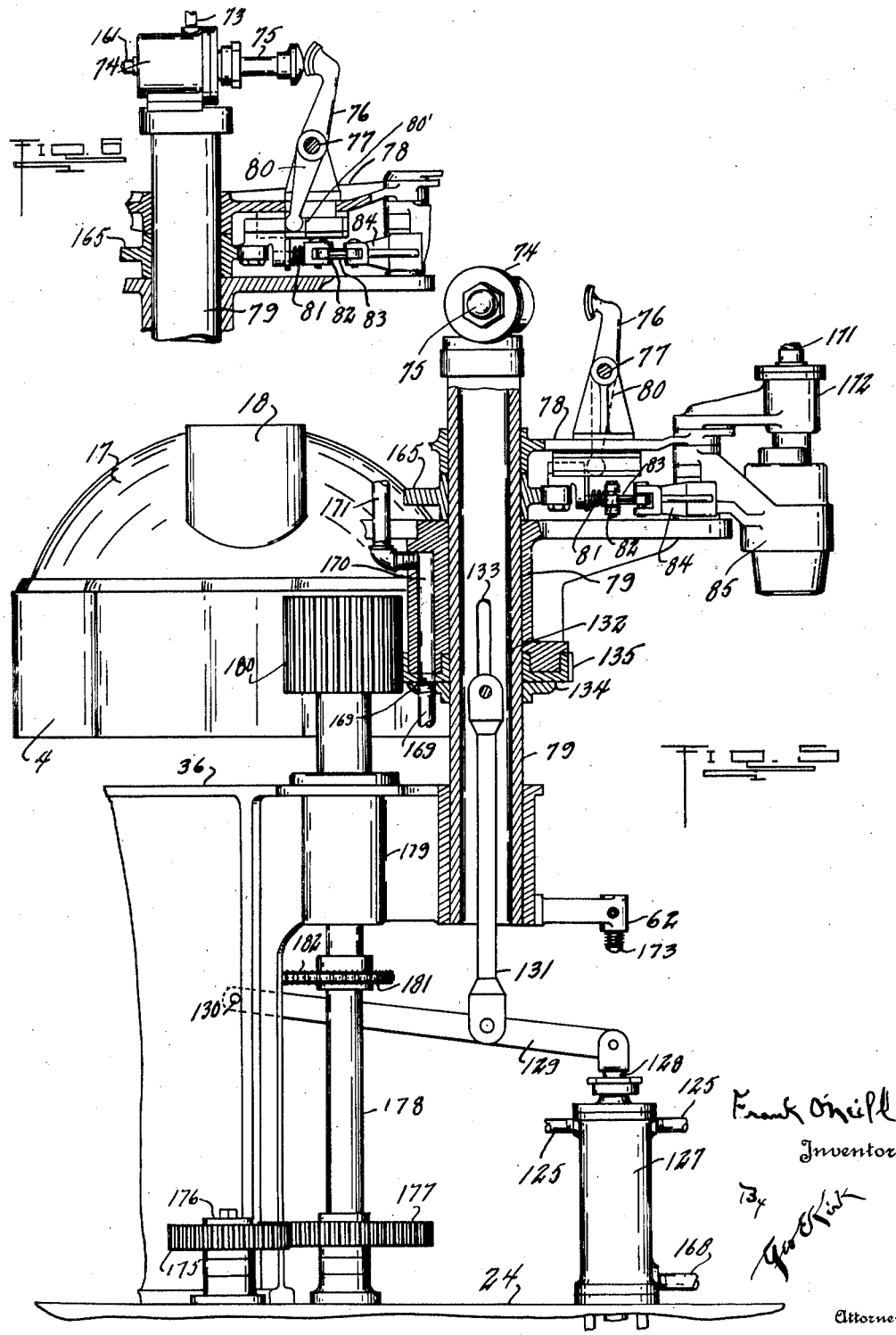

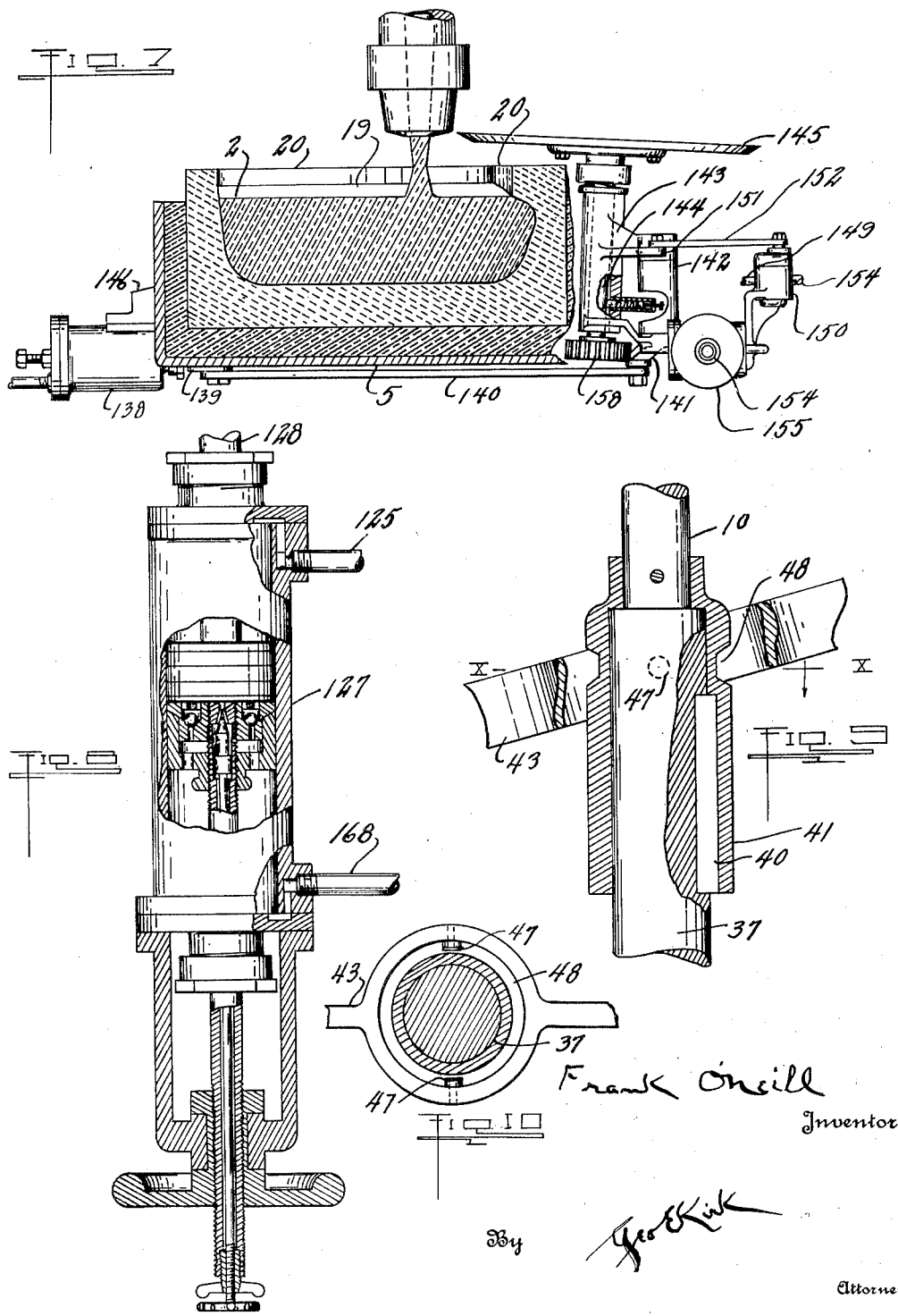

April 5, 1932.  F. O'NEILL  1,852,329
GLASS GATHERING
Filed March 19, 1927  6 Sheets-Sheet 6
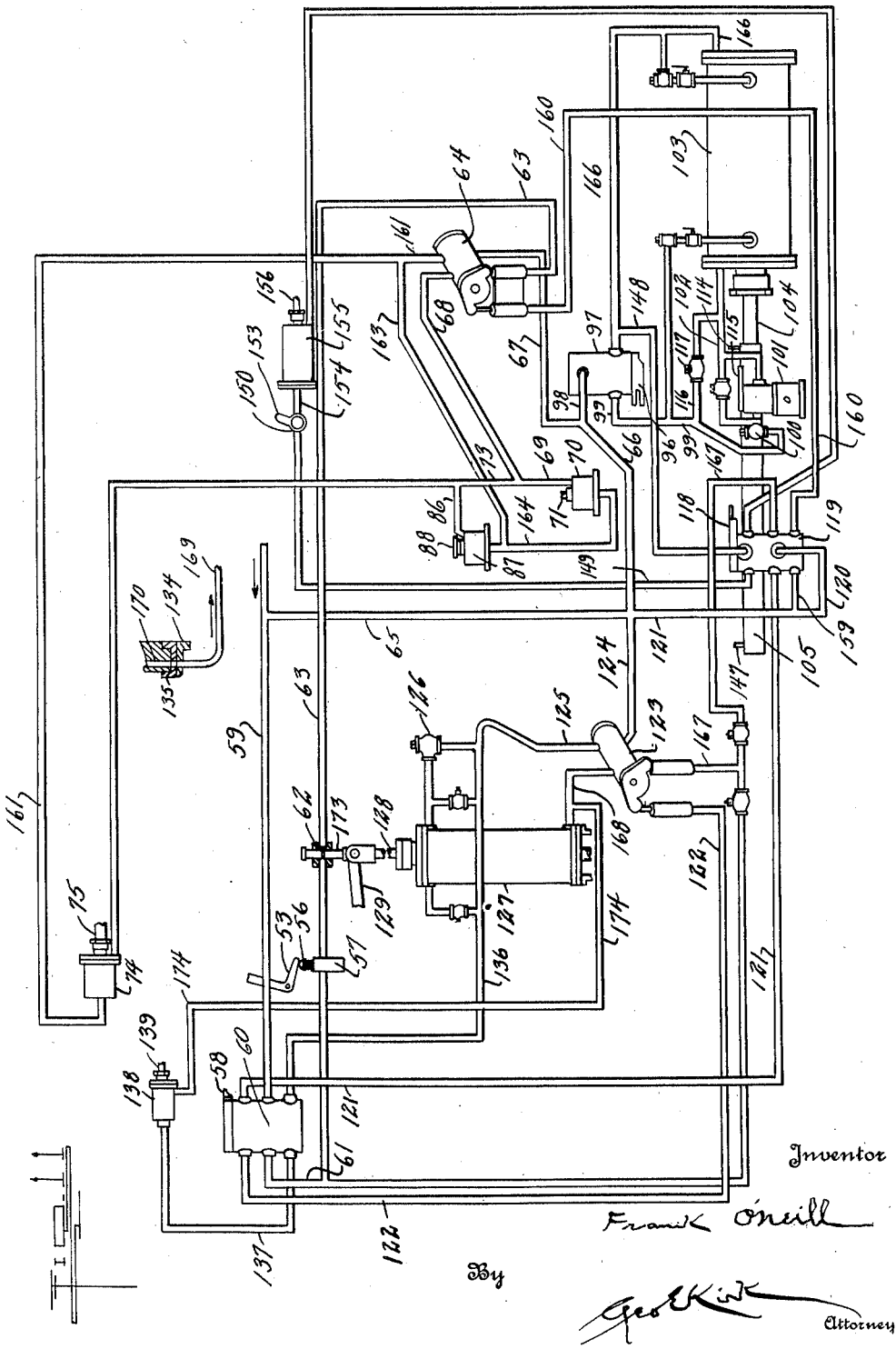
Inventor
Frank O'Neill
By
Geo E Kirk
Attorney Patented Apr. 5, 1932

1,852,329

UNITED STATES PATENT OFFICE

FRANK O'NEILL, OF TOLEDO, OHIO

GLASS GATHERING

Application filed March 19, 1927. Serial No. 176,645.

This invention relates to obtaining molten or liquid material from a pool.

This invention has utility when incorporated for gathering gobs of molten glass for forming such into articles of ware.

Referring to the drawings:

Fig. 1 is a plan view, with parts broken away, of an embodiment of the invention for gathering gobs to be formed into articles of ware;

Fig. 2 is a partial section on the line II—II, Fig. 1;

Fig. 3 is a fragmentary plan view of the actuating and transmission features of the apparatus as shown in Fig. 2;

Fig. 3a is a partial view of the shear drive;

Fig. 4 is a fragmentary view on a reduced scale in plan of the drive or main actuator for the ware forming machine and its transmission connection to the gather of this disclosure;

Fig. 5 is a partial section on the line V—V, Fig. 1;

Fig. 6 is a view on the line VI—VI, Fig. 1;

Fig. 7 is a partial section on the line VII—VII, Fig. 3;

Fig. 8 is a side elevation, with parts broken away, of the elevating and lowering device or control for the gather cup apparatus;

Fig. 9 is a detail view, with parts broken away, of the control for the paddle lifting;

Fig. 10 is a section on the line X—X, Fig. 9; and

Fig. 11 is a piping diagram of the power control connections.

Furnace 1 is shown as having molten glass 2 therein as a pool at a level for flow by opening 3 into overhang 4 having floor 5 with partial dam 6 and island boss 7. Opposing this dam 6 is skimmer 8 adjustable for clearance in holding back heat for the furnace as well as keeping floating impurities from working into the terminus of the boot overhang.

The boss 7 has central opening 9 therethrough. Upwardly disposed in this opening is shaft 10 having upper terminus 11 as a key upon which is mounted plate 12 having paddles or wings 13, 14, 15, 16, drooped downward toward the floor 5 and from the plate 12 for continuous submergence in the pool of molten glass in the boot during the rotation of the shaft 10. Opposing this floor 5, the overhang has fixed roof 17 and removable roof section 18 leaving clearance way 19 for gather operation with overhang 20 on the side of said gather opening 19 away from the removable roof portion 18. This roof portion 18 extends downwardly to the region of the plate 12 and is a closure against loss of heat from the portion of the pool of molten glass between the dam 6 and the shaft 10.

In order to keep up the temperature of this region of molten glass in the boot, gas burner 21 may be directed through opening 22 as a heater for a portion of the pool of glass. The glass as circulated by the paddles 13, 14, 15, 16, is a maintained continuous closed circuit. From this heated portion, adjacent the burner 21, under the removable roof portion 18, it flows into the gather portion 19, and thence back into the heated portion as a continuous closed circuit.

Removal of portions of the molten glass in the form of gathers may be had from this opening 19. In taking up the glass, say by an object coming theretoward, there is tendency to chill the glass and in the removal of the object there is a trailing portion to be cut off. In the event of the object, as coming to the surface of the pool of glass, has a travel direction, there is a tendency to string this trailing portion from the gather to have such drawn along the surface of the pool of the molten glass as a chilled portion which is cut off and falls into the pool. This direction of trailing for the chilled portion is in the direction of the closed circuit of the glass pool, and accordingly is at once worked back to the heated region of the burner 21 and away from mingling with a subsequent gather. In machine operations in conjunction herewith, it is desirable to have the circulation promotion device of the paddles operate in synchronism with such gather device, with clearance between the paddles for the gather take-up operation.

As herein shown wheels 23 on platform 24 carry motor 25 having shaft 26 connected by worm gear speed reduction 27 to drive sprocket wheel 28 on stub shaft 29. From this sprocket wheel 28 extends sprocket chain 30 about sprocket wheel 31 fixed with clutch member 32. Clutch sleeve 33 as controlled by lever 34 having fixed fulcrum 35 in frame 36 rising from the platform 24 may be operable to shift the clutch member 33 into driving engagement with the clutch 32. This clutch member 33 is splined to shaft 37 and accordingly effects rotation of this shaft 37 upon driving operation of the motor 25. This shaft 37 thus passes through sprocket wheel 38 loose thereon and is effective through spline 40 (Fig. 9) to drive sleeve 41 fixed with the shaft 10.

In the event there is not driving of this shaft 10 from the motor 25 or there is not driving of the shaft 27 from the operation of sprocket wheel 38 with the clutch 33 drawn from medial neutral position to engage clutch 42, it is important to take precaution that the paddle device be not left to freeze in the molten glass. Accordingly the roof section 18 may be lifted or removed, and hand lever 43, having fixed fulcrum 44 in the frame 36, may be shifted upward to have lock pin 45 engage opening 46 in the frame 36. In so elevating this lever 43, rollers 47, as coacting with groove 48 in the sleeve 41, serve to lift the paddles 13, 14, 15, 16, out of the pool of molten glass 2. This lifting maintains the angular relation of the shaft 37 with the shaft 10 due to the spline 40. The clutches 32, 33, 42, determine a maintained angular relation between the shaft 37 and the actuator whether such be the motor 25 or the wheel 38. This clutch operating lever 34 is provided with pin 49 which in neutral position engages opening 50 thereby precluding any drive operation for the paddle device. When the pin 49 is in opening 51, the sprocket 38 may be effective for maintaining driving rotation of the paddle device in synchronism with the gather device. When the clutch lever 34 is shifted downward and the pin 49 locks it in such down position engaged in opening 52, the motor 25 is effective for operating the device. In this shifting operation of the lever 34, the motor 25 is automatically started, for the lever 34 has arm 53 effective for closing switch 54 and thus connecting electric power lines 55 for driving the motor 25. At once the lever 34 is shifted to disconnect the clutch 33 from the clutch 32 the motor 25 is automatically stopped by the opening of the switch 54.

If there be further shifting of this clutch lever 34 to bring the clutch 33 into driving engagement with the clutch 42, the arm 53 of the lever acts against plunger 56 to open valve 57 and thus permit the gather device to be cut in (Figs. 2, 11).

When it is desired to start the gather device, lever 58 may be operated to admit flow of power air from line 59 past valve 60 to line 61 past this valve 57, open valve 62, by line 63 to operate rocker valve 64 similar to the rocker valve of Patent 1,490,182, Apr. 15, 1924. The power supply air line 59 has branches 65, 66, 67, to this valve 64. This operation of the rocker valve 64 permits flow of this power air from the line 67 by way of lines 68, 69, to cylinder 70 for operating piston rod 71 to shift plunger 72 upward into neck finish mold member 72'. This line 68 has branch 73 to cylinder 74 effective for retracting piston 75 thereinto for thereby clearing this piston from upper arm 76 mounted on fulcrum 77 carried by table 78 mounted on column 79. This lever arm 76 (Figs. 5, 6) has fixed therewith depending arm 80 extending into socket 80' having yieldable connection through spring 81 to cross head 82 effective through links 83 (Fig. 1) and arms 84 for throwing gather cup mold sections 85 into closed position. The line 73 has branch 86 extending to cylinder 87 (Figs. 4, 11) for causing piston 88 to descend thereinto, thereby effective through lever 89 for actuating lock bar pin 90 from recess 91 in table 92 as mounted on column 93. This lever 89 as rocking on fixed fulcrum 94 has link 95 extending to arm 96 to rock valve 97 similar to the lock bar device shown in Patent 1,462,652, July 24, 1923. This permits supply of power air from the line 67 by way of line 98 to flow by line 99 past check valve 100 and supplemental control valve 101 thence by line 102 to power cylinder 103. This causes piston rod 104 to move into said cylinder 103 and thereby, through its rack 105, operate segment 106 as clutched with gear 107 mounted on shaft 108 for driving in a counter-clockwise direction as shown in Fig. 4 similar to the drive of Patent 1,462,652, July 24, 1923. This shaft 108 is mounted on platform 109 carried by wheels 110 and disposed for connection by bolts 111 into predetermined definite assembly relation with the platform 24.

During the travel of this piston rod 104 on this driving stroke for actuating the blank table 92 from the gear 107 as well as below table 112 as mounted on column 113, pin 114 is effective upon arm 115 for closing valve 101 and thus shutting off the power air to the cylinder 103, before the end of the stroke. This allows the completion of the stroke due to the momentum of the moving parts, with the pressure air follow-up for less velocity by way of branch line 116 past adjustable one-way valve 117 into the line 102.

Before this completion of the driving stroke of the piston rod 104, the pin 114 has acted upon arm 118 at valve 119 for connecting power air from the line 65 by way of line 120 through this valve 119 to flow by line 121 past the manually controllable starting valve 60 thence by line 122 to rocker valve 123 for resetting this valve 123 so that power air from the line 65 may flow by line 124 through this valve 123 and line 125 past adjustable check valve 126 to the upper end of cylinder 127. This cylinder 127 has, as to its piston and cylinder control, features disclosed in U. S. Patent 1,551,526, Aug. 25, 1925.

This operation is effective for causing descent of piston rod 128 into this cylinder 127. This piston rod 128 (Fig. 5) is connected by lever 129 to fixed fulcrum 130 carried by the frame 36 as rising from the platform 24. This lever 129, intermediate its length, carries upwardly extending link 131. This link 131 extends upwardly through tubular column 79 and there has pin 132 extending through slots 133 to engage collar 134 loosely about the column 79. This collar 134 sustains relatively rotatable gear 135 fixed with table 78, thus rotatably mounted about this column 79. Accordingly this action of the piston and cylinder device 127, 128, lowers this table 78 as about the column 79, diversing the drive travel.

From the line 125 extends branch line 136 (Fig. 11) past the valve 60 and thence by line 137 to cylinder 138 for causing the piston rod 139 to move outward therefrom and thus (Figs. 1, 3) through link 140 and arm 141 mounted on fixed fulcrum 142 carried by bracket 142' the overhang 4 rock said arm 141 to swing therewith arm 143 mounting stub shaft 144 carrying inclined shear or cut-off disk 145 to swing such disk 145 away from gather path or opening 19 of a furnace boot or overhang. This cylinder 138 is mounted by bracket 146 in fixed relation with the overhang 5.

As the piston rod 104 approaches the end of its driving stroke, pin 147 coacts with arm 118 for further shifting therewith as to the valve 119. This connects line 148 from the valve 97 through this valve 119 with line 149 to valve 150. The arm 143 at the disk cutter has fixed therewith arm 151 having connection by link 152 (Figs. 3, 7) with arm 153 at the valve 150 so that in this outward swinging movement of the cutter disk 145 away from the gather position, valve 150 is opened for communication by line 154 to cylinder 155 for thrusting piston rod 156 therefrom and having its rack 157 operating upon pinion 158 fixed with the shaft 144 and the disk 145. The extent of operation of this rack 157 in coaction with the pinion 158 is such that a fractional rotation of the disk 145 is effected, which fractional rotation is of such number of degrees as not to go an equal number of times into a complete rotation or 360°. For instance the rotation may be 85° thus not bringing the same cutting region edge of the disk 145 into cut-off position as to closed gather mold section as to the bottom of a closed gather mold section 85 only after seventeen rotations and seventy-second operation.

This operation of the valve 119 as the piston rod 104 reaches the end of its driving stroke is also effective to connect up power air from line 120 by way of line 159 to flow by line 160 to reset valve 64 so that power air from the line 67 now flows by way of line 161 to the cylinder 74 for thrusting piston rod 75 therefrom. This condition arises as the piston rod 104 has reached the end of its driving stroke and the tables 78, 92, 112, have come to rest. Accordingly at this position, the power air from line 161, as acting upon the cylinder 74 to thrust the piston rod 75 therefrom, causes such piston rod to be effective on the lever 76, 80, to open the gather cup or mold section 85 and thus release a gather for discharge into closed blank mold section 162 as carried by the table 92. This power air supply line 161 from the valve 64 has branch 163 to the cylinder 87 for thrusting the piston rod 88 upward and through the lever 89 effective for thrusting the table lock pin 90 into a recess 91 in the table 92 holding the driving of the several tables from being effective through the intermeshing gear relations therebetween. The line 163 has branch 164 to cylinder 70 for thrusting piston rod 71 outward therefrom to withdraw the plunger 72 clear of the blank mold neck finish 72'. In the shifting of the table 79 to move the arm 76 clear of the piston rod 75 after mold closing operation, the cam 165 acts to hold such closed until in the region of the delivery to the blank mold 162.

The operation of the lock bar cylinder 87 is effective through the lever 89 for shifting the valve 97 into such position as to cut off power air as supplied by line 98 from flow by the line 99 to flow by line 166 into power cylinder 103 for thrusting piston rod 104 therefrom in the idle or recover stroke. This supply of power air to the line 166 provides a simultaneous supply to line 148 past the valve 119 for flow by line 149 past the valve 150 for operating the piston rod 156 in effecting the fractional rotation of the cut-off disk 145.

The outward travel of this piston rod 104 as approaching the end of its stroke resets the valve 101 due to the action of the pin 114 and thus by checking exhaust, slows up the final travel of the piston rod 104. Likewise the valve 119 is reset which connects up power air from the line 120 to flow by line 167 to reset the valve 123. This controls flow of power air from line 124 to line 168 for thrusting piston rod 128 upward for thereby lifting the table 78. Before this stop position, with the table 78 lowered, a gather cup 85 is in position adjacent the level of the pool of glass 2 at the gather opening 19. Furthermore, flexible suction air line 169 as connected to shiftable collar 134 has its elongated port 169′ in register with duct 170 from which extends line 171 to head 172 above the closed gather cup 85. There is thus a suction gather or lifting of the molten glass from the pool into this gather cup at the interval of contact or lowering of the table 78. The reversal of operation by the resetting of this valve 123 effecting upward movement of the piston rod 128 for lifting of the table 78 clears this gather cup from the sides of the overhang 5 in the path of travel of this gather cup as mounted by the table 78. In this lifting operation, the piston rod 128 strikes spring depressed stem 173 for closing valve 62, thus precluding any change in the position of the rocker valve 64, while this table is elevated. The line 168 has branch line 174 to the cylinder 138 effective in this interval for drawing the piston rod 139 into such cylinder and thereby through the link 140 swinging the disk 145 of the cutter into cut-off operation above the pool of glass in the overhang. There is thus effected a shearing operation of the molten glass from the gather after the gather is lifted from the tank and just after it is started in its travel counterclockwise.

The blank table 92 has driving connection by its gear with gear 175 mounted on shaft 176 carried by the platform 24 (Figs. 1, 2, 4, 5). This gear 175 is in mesh with gear 177 on shaft 178 mounted on the table 24 and having bearing 179 carried by the frame 36. This shaft 178 has fixed therewith long pinion 180 in mesh with the gear 135. Accordingly, in synchronism with the rotation of the blow table 112, and blank table 92, there is rotation of the gather table 78 which in the instance shown herein is intermittent although the same transmission connection may be effective for synchronism with a continuous drive.

Fixed with this shaft 178 below the bearing 179 is sprocket wheel 181 having sprocket chain 182 extending about sprocket wheel 38 loosely mounted on the shaft 37. With the clutch lever 34 thrown into engagement to have its clutch 33 in mesh with clutch 42 fixed with the sprocket wheel 38 there is synchronism in driving of these molten glass pool circulating paddles 13, 14, 15, 16, with the travel of the gather cups 85. This movement may be intermittent as the operation of the tables is intermittent. But whether the operation be continuous or intermittent at the gather position for the gather cup 85, the paddles should be clear of interference with such gather cup as coacting with the pool of molten glass.

In the operation hereunder, the throwing of the control valve 58 may be effective through the sequence of pneumatic devices for effecting operation of the drive cylinder 103 effective during its power stroke of the piston rod 104 inward to have the table 78 elevated so there is no gather and rotation of the gather table 78 in synchronism with the blank table 92, which blank table 92 may deliver a blank mold therefrom to the blow table 112, each carrying an annular series of molds, say six molds each for the blank and blow tables, and three gather cups for the gather table. As the piston rod 104 has completed its driving stroke, the table 78 may be lowered to suction position in the gather opening 19 at the pool of glass, as the pool of glass has had the paddles operating therein for bringing fluid warm glass into position for such gather. The suction operation occurs as the table 78 moves and is completed just before the table is elevated. Thereafter the rotary shear 145 is effective for severing adherent or surplus glass from the gather cup to fall back into the pool as a more or less chilled glass portion. At the timing sequence, there may be a slight movement of this glass as drawn from the pool by the gather cup in the direction of the gather cup travel. In any event this chilled portion of the glass as severed, is immediately worked by the paddles clear of the opening 19 and back into the heated region in the forehearth or boot to be rewarmed with the exposing of a fluid glass region for a subsequent gather.

In the event there is to be a shut down, for care of the machine with the melt in the furnace still at its working level, the temporary shut down may be taken care of by auxiliary motor 25. To this end the clutch lever 34 may be operated to cut out drive connection from the sprocket 38 for the driving connection with the sprocket 31. This operation of the lever 34 is effective through the valve 56 for cutting out any pneumatic operation which would effect the sequence of operations of the gather cups so that the gather cups 85 are elevated and as so clear of the pool there may be continuous rotation of the paddles to maintain the glass in the forehearth against freezing and with a fluidity for readily starting up of the machine after the shut down, if it be but temporary. For more extended shut down, the paddle device may be removed from the pool of molten glass. This is effected by removing the roof section 18 and then by operating the lever 43, lift this metal paddle device, which at all times in normal operation is in the pool of the molten glass and submerged in such pool.

In the shearing operation of the disk 145, this disk 145 is yieldably held to ride along the underside of the gather cup 85 by block 183 (Fig. 7) as positioned by adjustable compression spring 184.

In instances where it is not desired to lift the roof of the boot and where it is desired to shut down the operation of the device for more than temporary interval, the paddle device may be kept from freezing in the glass by dropping dam 8 and removing drain plug 185 in the floor 5 of the overhang or boot thus to draw off the molten glass from the boot before such freezes and get such glass clear of the nichrome paddle 13, 14, 15, 16. This metal paddle as continuously in the glass during operation hereunder is of a material not tending to dissolve or discolor the glass.

It will be seen from the foregoing that this suction gather device, as traveling, has its suction effective at the lowered position. The cycle of operations is that the table 79 is lowered during its travel and that its periods of rest are in the elevated position. The suction begins as the lower portion of the gather cup 85 is at the surface of the glass and this suction continues until just before the lifting occurs. This lifting during the driving operation is permitted by the long pinion 180 as coacting with the gear 135.

What is claimed and it is desired to secure by Letters Patent is:

1. A furnace structure providing a pool of molten glass having an opening thereabove for upward withdrawal of gathers therefrom, and a rotary molten glass circulating paddle device operable in the pool on an axis perpendicular to the surface of the pool, said paddle having a greatest radial extent portion thereof continuously submerged in the pool and spaced from the surface of the pool, the surface of the glass above the paddle device being free and unobstructed.

2. A furnace for a pool of molten glass having an open top gather portion, and a vertical axis paddle device having a greatest radial extent portion thereof continuously submerged in the pool and spaced from the surface of the pool to approximate the temperature of the pool and disposed to operate past said gather portion, the surface of the glass above the paddle device being free and unobstructed.

3. A glass furnace tank having an overhang provided with an exposed gather region, a rotary shaft in the overhang laterally of the gather region, and a paddle in the overhang for full rotation operation by said shaft beyond said gather region, said paddle as below the surface of the pool being of greater radial extent in thereby creating greater lineal sub-surface velocity, the surface of the glass above the paddle being free and unobstructed.

4. A furnace having a molten glass pool, said furnace having an overhang therefrom provided with a floor over which said pool extends, a rotary shaft upwardly through the overhang floor, a paddle in the overhang to be operated by said shaft, a removable roof for the overhang above said shaft, and means for lifting the shaft as cleared of the roof for shifting the paddle device out of the pool.

5. A furnace having a molten glass pool, said furnace having an overhang therefrom provided with a floor over which said pool extends, a rotary shaft upwardly through the overhang floor, a paddle in the overhang to be operated by said shaft, said paddle having its greater radial extent spaced below the surface of the pool, a gather device for removing glass from the pool, a device for the gather device, and connections from the gather device for controlling the paddle device operation in synchronism with the gather device.

6. A furnace having a molten glass pool, said furnace having an overhang therefrom provided with a floor over which said pool extends, a rotary shaft upwardly through the overhang floor, a paddle in the overhang to be operated by said shaft, said paddle having its greater radial extent spaced below the surface of the pool, a gather device for removing glass from the pool, a drive for the gather device, transmission connections from the gather device for controlling the paddle device operation in synchronism with the gather device, and connection for connecting the paddle device for actuation by the gather device or permitting actuation independently thereof.

7. A glass furnace for a pool of molten glass having an open top gather portion, a vertical axis multiple paddle device for circulating molten glass past said open portion, said paddles having their outward termini submerged, independent, and of greater area below the surface of the pool, a gather device, a cut-off device for gather surplus to fall back into the furnace, and a drive for the devices in synchronism.

8. A glass furnace for a pool of molten glass having an open top gather portion, a vertical axis multiple paddle device for circulating molten glass past said open portion, said paddles having their outward termini submerged, independent, and of greater area below the surface of the pool, a gather device, a cut-off device for gather surplus to fall back into the furnace, and driving means for the devices effective to position and operate said cut-off device.

9. A glass furnace having an open top gather portion, a gather device for operating thereinto, a disk cut-off for cooperating with said gather device to have surplus gather fall back into the furnace, means for rotating the disk as away from the gather device and means for axially shifting the disk as to cooperative position with the gather device.

10. A glass furnace having an open top gather portion, a gather device for operating thereinto, a disk cut-off for cooperating with said gather device to have surplus gather fall back into the furnace, an intermittent rotation actuator for the disk of the cut-off device, and means for shifting the disk into position as to the gather device.

11. A glass furnace having an open top gather portion, a gather device for operating thereinto, a disk cut-off for cooperating with said gather device to have surplus gather fall back into the furnace, a rack for rotating the disk of the cut-off device, and an arm for shifting the disk into position as to the gather device.

12. A glass furnace having an open top gather portion, a gather device for operating thereinto, a disk cut-off for cooperating with said gather device to have surplus gather fall back into the furnace, and angular rotation means for shifting the disk in fractional rotations as totaling unequal to a single rotation.

13. A glass furnace having a solid mass submerged metallic glass circulating device therein approximating the temperature of the molten glass as directly exposed to the molten glass.

14. A glass furnace for a pool of molten glass, an overhang therefrom having a gather opening top approximating the level of the pool, a controllable drain for the overhang independent of said gather opening, and an adjustable dam between the overhang and the furnace shiftable for cutting off glass communication from the furnace with the drain.

15. A glass furnace for a pool of molten glass, an overhang therefrom having an upwardly open surface gather opening, there being opening-restricting inwardly-projecting ledge means over the pool surface.

16. A glass furnace having an open top gather portion, a gather device for operating thereinto, a cut-off for cooperating with said gather device to have surplus gather fall back into the furnace, actuating means for moving the device toward the cut-off and therebeyond, a traveling mold, and discharge means for the gather from the device into the mold.

17. A glass furnace having an open top gather portion, a suction gather device for operating thereinto, a cut-off for cooperating with said gather device to have surplus gather fall back into the furnace, a rotary support for moving the device toward the cut-off and therebeyond, and an open top traveling mold over which the device is movable for discharge of the gather from the device into the mold.

18. A glass furnace having an open top gather portion, a suction gather device for operating thereinto, said device comprising hinged sections, a cut-off for cooperating with said gather device to have surplus gather fall back into the furnace, a rotary support for moving the device toward the gather portion and therebeyond, an open top traveling mold over which the device is movable, and means for opening the device for dropping gather therefrom into the mold.

In witness whereof I affix my signature.

FRANK O'NEILL.

CERTIFICATE OF CORRECTION.

Patent No. 1,852,329.                              Granted April 5, 1932, to

FRANK O'NEILL.

It is hereby certified that error appears in the printed specification of the above numbered patent requiring correction as follows: Page 5, line 81, claim 5, for the word "device" read drive; and that the said Letters Patent should be read with this correction therein that the same may conform to the record of the case in the Patent Office.

Signed and sealed this 26th day of April, A. D. 1932.

(Seal)

M. J. Moore,
Acting Commissioner of Patents.